(12) United States Patent
Lacaze

(10) Patent No.: US 11,161,450 B2
(45) Date of Patent: Nov. 2, 2021

(54) AUTONOMOUS HEADLIGHT CONTROL BASED ON ELEVATION PROFILE

(71) Applicant: Robotic Research, LLC, Clarksburg, MD (US)

(72) Inventor: Alberto Daniel Lacaze, Polomac, MD (US)

(73) Assignee: Robotic Research, LLC, Clarksburg, MD (US)

( * ) Notice: Subject to any disclaimer, the term of this patent is extended or adjusted under 35 U.S.C. 154(b) by 301 days.

(21) Appl. No.: 16/277,296

(22) Filed: Feb. 15, 2019

(65) Prior Publication Data

US 2020/0262333 A1 Aug. 20, 2020

(51) Int. Cl.
| | | |
|---|---|---|
| *B60Q 1/08* | (2006.01) | |
| *B60Q 1/14* | (2006.01) | |
| *B60Q 1/04* | (2006.01) | |
| *G01C 5/00* | (2006.01) | |

(52) U.S. Cl.
CPC ............. *B60Q 1/085* (2013.01); *B60Q 1/045* (2013.01); *B60Q 1/143* (2013.01); *G01C 5/00* (2013.01)

(58) Field of Classification Search
CPC .......... B60Q 2300/314; B60Q 2300/32; B60Q 2300/322; B60Q 2300/42; B60Q 2300/41; B60Q 2300/40; B60Q 2300/335; B60Q 2300/332; B60Q 2300/14; B60Q 1/14; B60Q 1/1407; B60Q 1/1415; B60Q 1/1423; B60Q 1/143; B60Q 1/1438; B60Q 1/1446; B60Q 1/1453; B60Q 1/1461; B60Q 1/1469; B60Q 1/1476; B60Q 1/1484; B60Q 1/1492
See application file for complete search history.

(56) References Cited

U.S. PATENT DOCUMENTS

| | | | |
|---|---|---|---|
| 5,065,288 A | 11/1991 | Broggelwirth | |
| 5,329,206 A | 7/1994 | Slotkowski et al. | |
| 5,331,251 A | 7/1994 | Marois | |
| 5,469,340 A | 11/1995 | Heizmann | |
| 6,144,158 A | 11/2000 | Beam | |
| 7,402,786 B2 | 7/2008 | Schofield et al. | |
| 9,372,112 B2 * | 6/2016 | Morishita | B60Q 1/14 |
| 10,331,956 B2 * | 6/2019 | Solar | G06K 9/46 |
| 10,464,470 B2 * | 11/2019 | Ohno | H04N 7/183 |
| 10,611,293 B2 * | 4/2020 | Park | B60Q 1/143 |

* cited by examiner

*Primary Examiner* — Robert J May
(74) *Attorney, Agent, or Firm* — RowanTree Law Group, PLLC; Carson C. K. Fincham

(57) ABSTRACT

The autonomous headlight height adjustment and masking system disclosed herein may comprise a system that automatically adjusts the level of the headlamps based on the elevation profile to be traversed so as not to blind other traffic by the controller of the high beams adjusting the headlamp to illuminate areas that do not interfere with other humans or vehicles based on the profile of the road or via another method in which there is a mechanism for masking or blocking the light emitted by the head light with a dynamic LCD or light segmented into different areas where they can be selectively turned on and off.

11 Claims, 5 Drawing Sheets

AUTONOMOUS HEADLIGHT CONTROL BASED ON ELEVATION PROFILE

TECHNICAL FIELD OF THE INVENTION

The present invention relates in general to autonomous systems, and, more specifically, to an autonomous headlight height adjustment and masking system.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The use of the high-beam lights in vehicles has alleviated some of the problems associated with dim lighting and night driving, such as being able to see further down the road, seeing street signs, traffic signs, animals, bicyclists, and pedestrians. However, in many cases, the use of high-beam headlamps, especially for long periods of time and when vehicles are oncoming or preceding, the vehicle has resulted in blinding other traffic and resulted in many traffic related crashes, injuries, and deaths. One of the problems of existing headlights is that there are only two settings: low-beam and high-beam. A person can operate the vehicle on high-beams only when there is no oncoming traffic or a preceding car ahead of them. Once a vehicle is approaching or overtaken, the driver must switch back to the low-beam mode to prevent the other driver from being blinded by the high-beam lights.

For many drivers, the use of low-beam lights makes the lighting so dim that it is hard to read street signs, obstructions, potholes, terrain features and sometimes even pedestrians, animals, and bicyclists. However, in many circumstances it is impossible to use the high-beams even temporarily without impairing other motorists.

There have been several attempts to solve these problems and they fall into the following categories: systems that sense the oncoming headlights and cause the car to switch to the low beam mode, systems to move the headlamps in response to changes that occur to the automobile on which they are mounted, systems that attempt to control the intensity profile of the beam by using a reflector or lens shaped to control the output beam in some predetermined way, and systems that use polarizers in the headlight and a cross polarizer in the windshield.

However, all these systems that have been developed have shortcomings. Also, there has not been a method developed to automatically adjust the headlamps based on thr elevation profile on vehicles of different elevations. Automatic headlight dimming devices such as U.S. Pat. No. 5,329,206, are well known in the art and address driver forgetfulness but do not solve other problems. Control of the shape and direction of the headlight is also taught in U.S. Pat. Nos. 5,065,288 and 5,469,340, but this is overall only a compromise between reducing glare and providing enough light to the driver for adequate visibility. More importantly, the driver that is oncoming is not in the area of reduced light. Another method that has been developed is one in which the headlight is steered upward or downward as described in U.S. Pat. No. 5,331,251. In this case, the elevation angle is changed in response to variations in vehicle attitude based on sensing its headlight reflections from the road. This method, while it might compensate for changes in loading and spring sag, may not correctly sense the change in effective beam position that arises when cresting a rise in a wavy road. There is also a polarization approach that has been developed that solves some of the problems, but this method requires that all drivers and vehicles be equipped with some type of polarizing means, which is highly impractical. Most importantly, none of these methods consider the elevation profile.

There has been a method developed that solves the above problems but does not adjust the headlamp automatically based on the elevation profile. Adjustment of the high-beam based on the elevation profile is very important to not blind the oncoming traffic or the preceding traffic in front of you. In U.S. Pat. No. 6,144,158, there is production of a beam of light comprised of many microbeams and employing a sensor to locate light sources forward of the apparatus and using that information to control the intensity or the angular position of one or more narrow-angle microbeams which are a part of many beams comprising the overall output beam. There has been another method that involves the generation of low beams and high beams that adjusts to various environmental conditions such as city light, country light, highway light, dynamic-curve light, and practically any other light distribution. However, this method does not consider the effects associated with different elevations and automatic adjustment of headlamps based on the elevation profiles.

There is also a partial high beam method that has been developed in which a portion of the high beam distribution is shadowed in a xenon high-beam module. Here, the movable conFIGurations hinge on a horizontal axis or screening cylindrical diaphragms shade a portion of the high beam in which other road users are detected. The light module for generating the partially-shaded high-beam light distributions or headlights with the light module are moved by a suitable actuator, or multiphase motor, in such a manner that a receding vehicle or an oncoming vehicle will be in the region of the dark zone. However, this method is a different process and does not involve masking or blocking the light emitted by the headlight with a dynamic LCD or similar technology or having the light segmented into different areas where they can be selectively turned on and off such as in the present invention. The partial high beam method is only for partial shading and, more importantly, is not for selectively turning on and off different parts of the high beam based on the elevation profile.

Thus, there is a need in the art for an autonomous headlight height adjustment and masking system. It is to these ends that the present invention has been developed.

BRIEF SUMMARY OF THE INVENTION

To minimize the limitations in the prior art, and to minimize other limitations that will be apparent upon reading and understanding the present specification, the present invention describes an autonomous headlight height adjustment and masking system.

It is an objective of the present invention to provide an autonomous headlight height adjustment and masking system that adjusts the level of the headlamp according to the elevation profile to be traversed in a manner to not blind other traffic.

It is another objective of the present invention to provide an autonomous headlight height adjustment and masking system that creates a projection of the location of the road and determines the Euler angles at which a vehicle could be present.

It is another objective of the present invention to provide an autonomous headlight height adjustment and masking system that involves a mechanism for masking or blocking the light emitted by the head light beam based on the elevation profile via a dynamic LCD or having light segmented into different areas where they can be selectively turned on.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the FIG. have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

The present invention involves a system that automatically adjusts the level of the headlamp according to the elevation profile to be traversed in a manner to not blind other traffic. Other traffic includes oncoming traffic, such as cars, sport utility vehicles (SUVs), trucks, or school buses, from the opposite direction, preceding traffic from the same direction, pedestrians from the opposite direction, and bicyclists from the opposite direction.

One such algorithm to achieve this starts by creating a projection of the location of the road, from a priori data or information acquired through sensors, and determining the Euler angles at which a vehicle could be present. It then detects within those areas vehicles with headlights or humans, and, based on those detections, adjusts the level of the headlights to match the Euler angles of the lowest detection plus some safety margin.

Another embodiment of the invention involves a mechanism for masking or blocking the light emitted by the head light based on the elevation profile via a dynamic liquid crystal display (LCD) or segmenting the light into different areas where individual beams can be selectively turned on and off.

Figure 1:
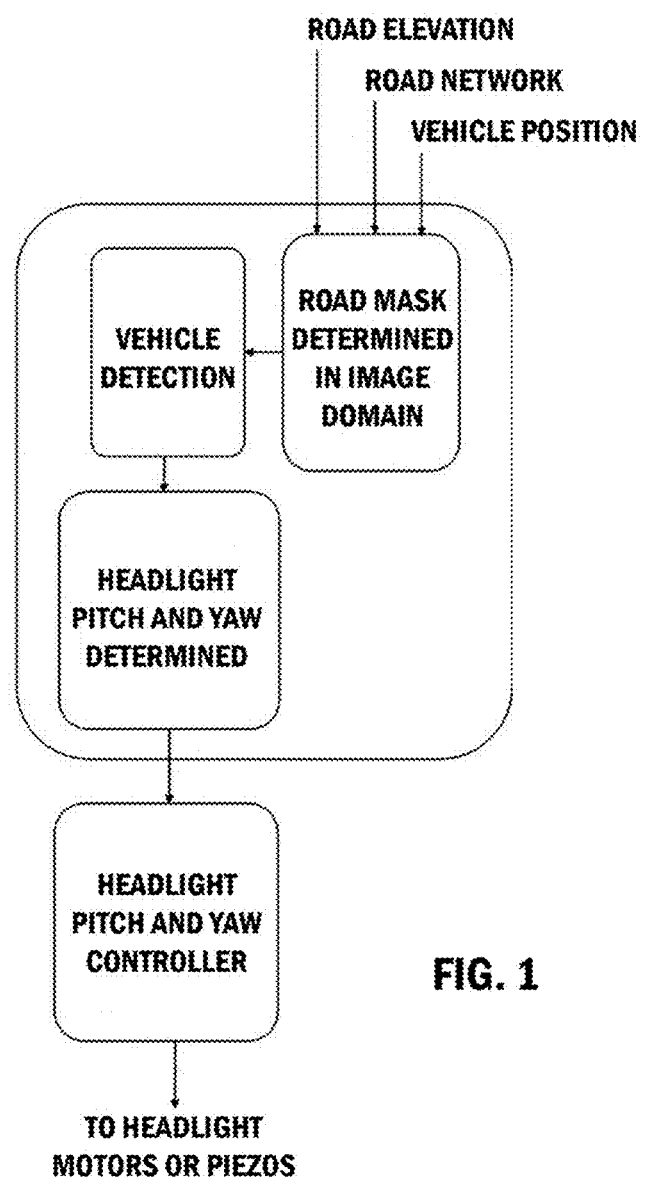
FIG. 1 illustrates a schematic of how the automatic adjustment of the headlights occurs based on the elevation profile, as contemplated by the present disclosure.

FIG. 1 illustrates a system that automatically adjusts the level of the high beam headlamps according to the elevation profile, according to an aspect of the present invention. The system may be used in any vehicle, such as cars, trucks, buses, or motorcycles, that operate in a road network. In the system, based on the vehicle position, road network, and road elevation, the road masks in image domain are determined. Next, the vehicle is detected, and the vehicle pose and attitude are sensed, and the headlight pitch and yaw are determined for the vehicle that is detected. Then the headlight pitch and yaw controller of the first car is adjusted so as not to blind the oncoming traffic and illuminate areas that are not occupied by oncoming traffic. The headlight pitch and yaw controller then directs the action of the headlight motors or piezos.

The elevation profile is measured by laser detection and ranging (LADAR), stereo camera, other ranging sensors, or known a priori. LADAR is a surveying method that measures the distance to a target by illuminating the target with pulsed laser light and measuring the reflected pulses with a sensor. A stereo camera is a type of camera with two or more lenses with a separate image sensor or film frame for each lens. This allows the camera to simulate human binocular vision, and therefore gives it the ability to capture threedimensional images, a process known as stereo photography. Stereo cameras may be used for making stereo views or for range imaging.

Also, the system in FIG. 1 incorporates some hysteresis or maintains a moving average or Kalman filter so not to create fast light adjustment cycles that may bother the driver.

The elevation profile and the road network information are used to differentiate incoming headlamps from other lights in the road, such as street lamps and lights in houses.

The system of FIG. 1 with an algorithm creating a projection of the location of the road, from a priori data or information acquired through sensors, and determining the Euler angles at which a vehicle could be present and then detects within those areas, vehicles with headlights or humans, and adjusts the level of the headlights to match the Euler angles of the lowest detection with some safety margin. The algorithm has a minimum or maximum beam height that could be tied to the elevation of the road at some point ahead of the vehicle.

Figure 2:
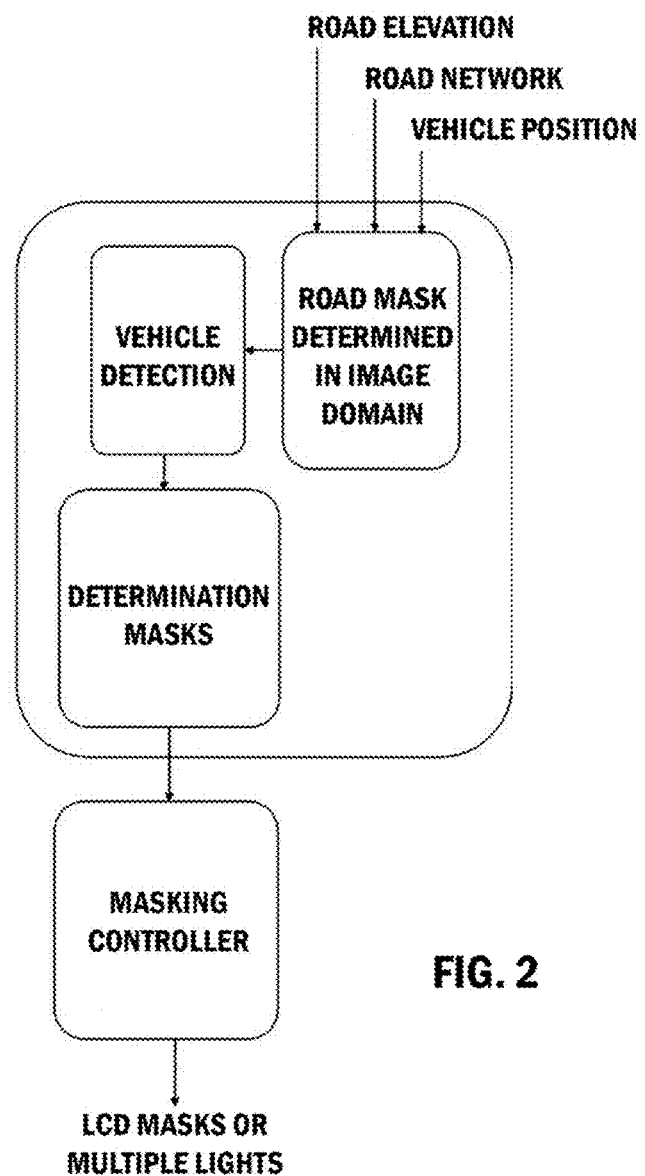
FIG. 2 illustrates a schematic of how the masking or selective blocking of light occurs based on the elevation profile, as contemplated by the present disclosure.

FIG. 2 illustrates another embodiment which consists of a system that masks or blocks light in the headlamps according to the elevation profile, according to an aspect of the present invention. The system may be used in any vehicle, such as cars, buses, trucks, or motorcycles, that operate in a road network. In the system, based on the vehicle position, road network, and road elevation, the road masks in image domain are determined. Next, the vehicle is detected, and determination masks are used which are adjusted using the masking controller. This involves using LCD masks or multiple light beams. The system involves blocking the light with a dynamic LCD or similar technology or having light segmented into different areas where they can be selectively be turned on or off. In this method, the headlamp is not actually adjusted, and the light is blocked or not emitted in areas where other vehicles are present. In addition, partial blocking is also possible so as not to blind the other driver but still make them aware of their presence.

Figure 3:
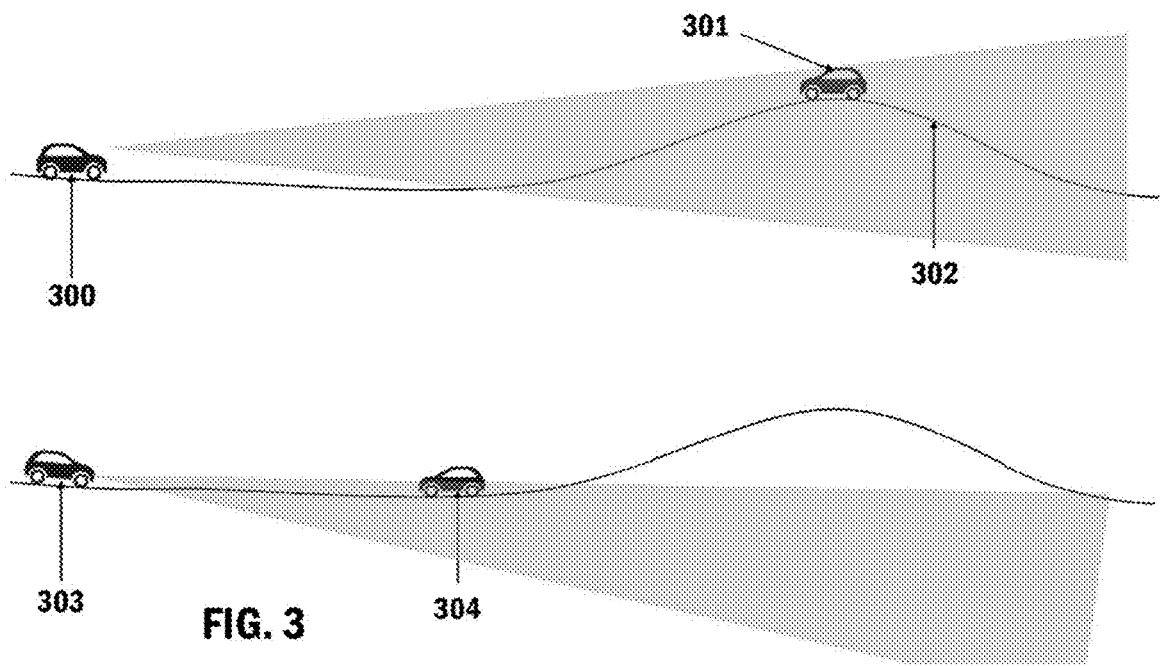
FIG. 3 illustrates an example where the high beam of a car causes blinding of the oncoming car on the opposite side in a high elevation profile, and where the low beam of a car shines onto the headlights of the oncoming car on the opposite side, as contemplated by the present disclosure.

FIG. 3 illustrates vehicle 300 located at a flat elevation level with high beams that blind vehicle 301 on a high elevation level 302. This is an example of how current high beam headlights function in the industry and in the real world. This problem of blinding other vehicles poses a serious problem in terms of vehicular crashes, injuries, and deaths. The present invention shows two embodiments on ways to prevent blinding of oncoming traffic, which systems are presented in FIGS. 1 and 2. FIG. 3 illustrates vehicle 303 located at a flat elevation level with low beams that shine onto the headlights of vehicle 304. This is a standard type of lighting situation that does not blind the vehicle on the opposite side.

Figure 4:
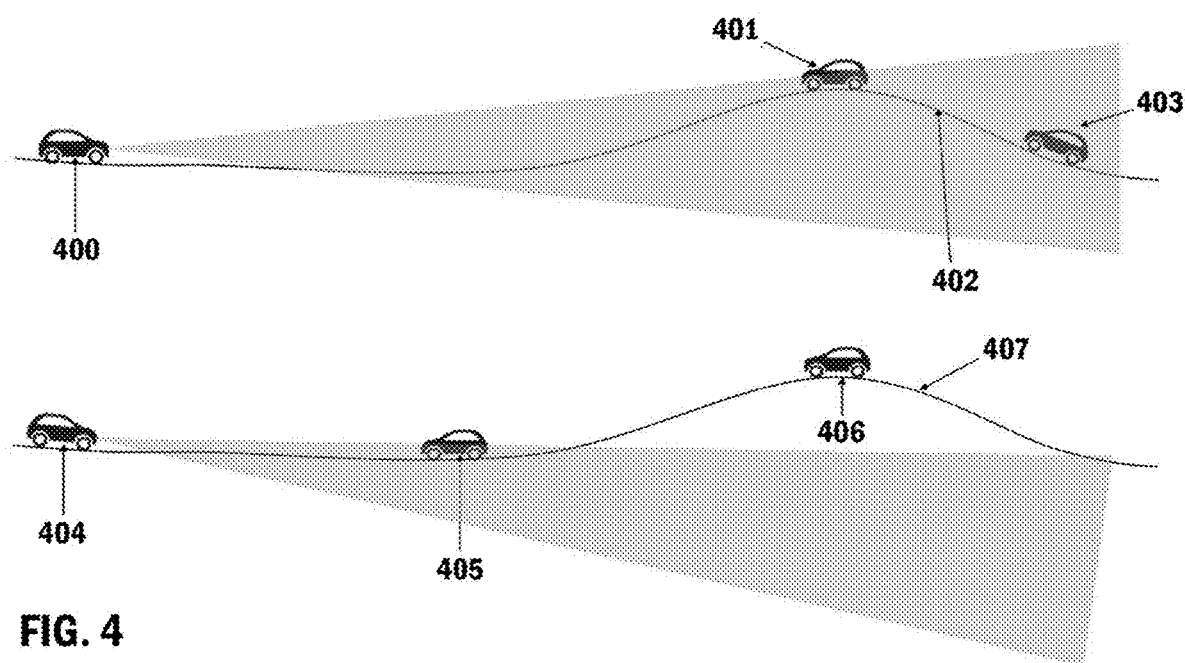
FIG. 4 illustrates an example where the low beam of a car shines on the headlights of two cars on the opposite sides with different elevation profiles, and an example of the low beam of a car shining on the headlight of a car on the opposite side at the same elevation, as contemplated by the present disclosure.

FIG. 4 shows a scenario where the low beam of vehicle 400 shines on the headlights of vehicles 401 and 403 on the opposite side. Vehicle 401 is at the highest point of the elevation profile 402 and vehicle 403 is climbing onto the elevation profile. This is a typical lighting situation that will not blind the vehicles on the opposite side. FIG. 4 shows a scenario where vehicle 404 on a flat elevation level shines its low beams onto an oncoming vehicle 405 that is also on a flat elevation level. In addition, the low beams of vehicle 404 does not shine on vehicle 406 located at the highest elevation point of the elevation profile 407. This is also a typical lighting situation that will not blind the vehicles on the opposite side.

Figure 5:
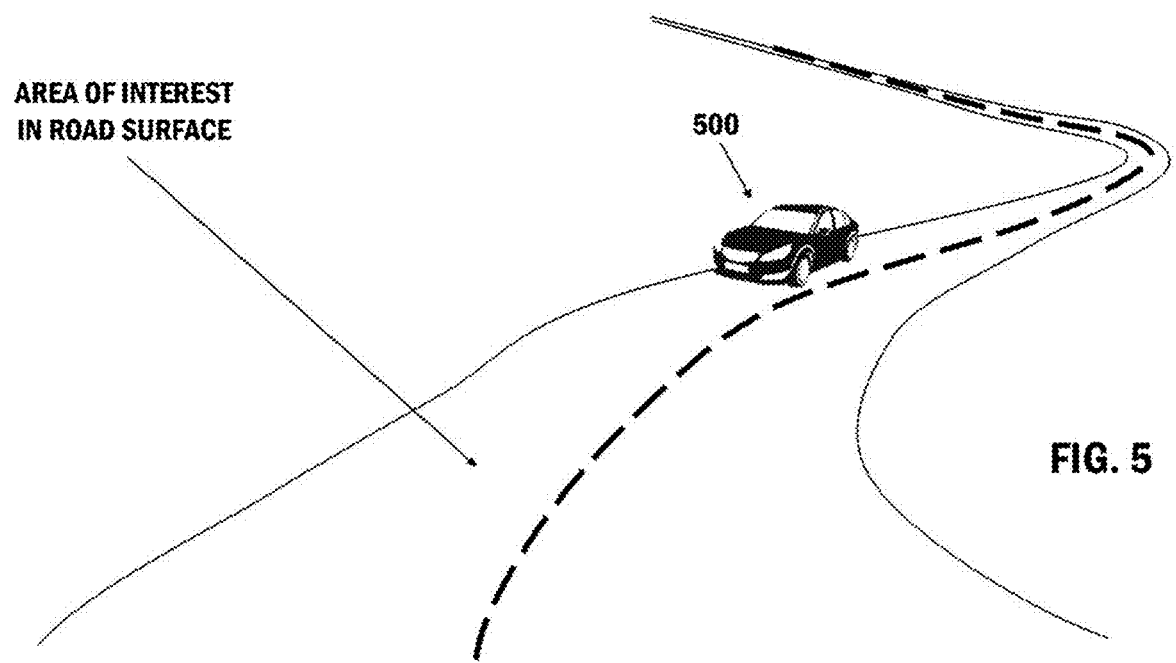
FIG. 5 illustrates a car travelling along a road with the area of interest defined by road detection or a priori road, as contemplated by the present disclosure.

FIG. 5 shows vehicle 500 traveling along a road with the area of interest of the high beam headlights that is defined by road detection or a priori road data. In this scenario, the car is located very close by.

Figure 6:
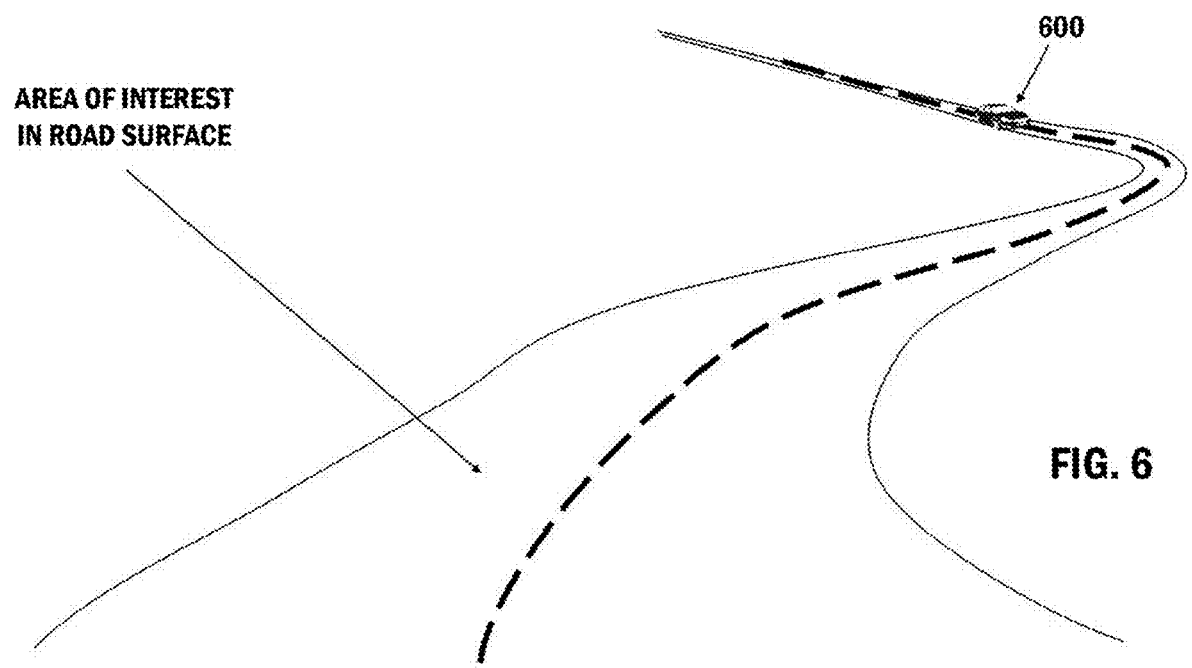
FIG. 6 illustrates a car travelling along a road with the area of interest defined by road detection or a priori road, as contemplated by the present disclosure.

FIG. 6 shows vehicle 600 traveling along a road with the area of interest being the area of interest of the high beam headlights that is defined by road detection or a priori road. In this scenario, the car is located very far away, and there is a very large area of interest.

Figure 7:
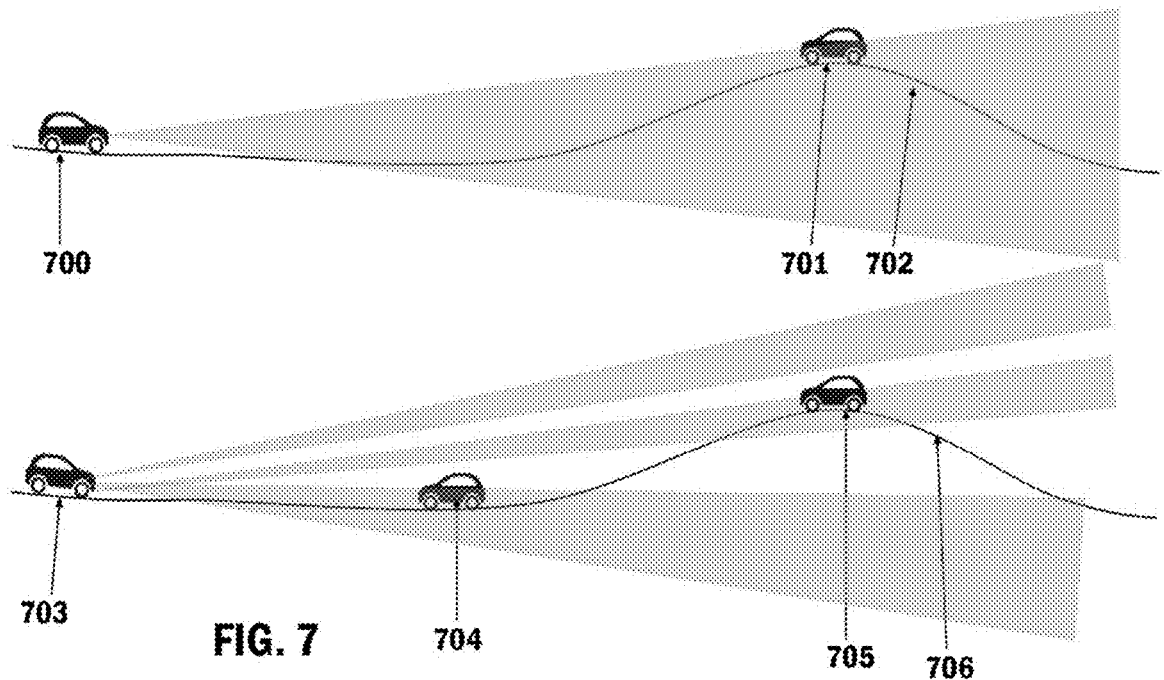
FIG. 7 illustrates the high beam of a car that is adjusted so as not to blind the other oncoming car on the opposite side, and the high beams of a car that are adjusted to not blind the two oncoming cars on the opposite side. The low beams shine on the headlights of both cars on the opposite side, as contemplated by the present disclosure.

FIG. 7 shows a scenario where the high beam headlights of vehicle 700 are adjusted so that it does not blind the oncoming vehicle 701. In addition, the low beam headlights of vehicle 700 shine onto the headlights of oncoming vehicle 701. This scenario shows the embodiment of the present invention in which the headlights are automatically adjusted in a manner so as not to blind the vehicle coming on the opposite side. FIG. 7 also shows a scenario where the high beam headlights of vehicle 703 are adjusted so that it does not blind either oncoming vehicle 704 or oncoming vehicle 705. In addition, the low beam headlights are split off to shine on the headlights on both vehicles 704 and 705. Again, this is an example of the embodiment of the present invention in which the high beam headlight is automatically adjusted in order to avoid blinding other traffic.

FIG. 7 shows examples of an embodiment where the headlamps are automatically adjusted based on the elevation profile in order to avoid blinding oncoming traffic on the opposite side. In this system, the elevation profile is measured by LADAR, stereo camera, other ranging sensors, or known a priori. The oncoming vehicle pose and attitude is sensed, and the high beam controllers adjusts the headlamp to illuminate areas that do not interfere with other humans or vehicles based on the profile of the road. The headlamps are adjusted to not blind the first vehicle or human in contact with the beam. In FIG. 7 the headlamps do not blind two oncoming cars in the road.

The elevation profile and road network data is used to differentiate incoming headlamps from other lights in the road such as street lamps and houses. The system also has some hysteresis or maintains a moving average or Kalman filter so not to create fast light adjustment cycles that may bother the driver. The system uses an algorithm that creates a projection of the location of the road, from a priori data or information acquired through sensors, and determining the Euler angles at which a vehicle could be present and then detects within those areas, vehicles with headlights or humans, and adjusts the level of the headlights to match the Euler angles of the lowest detection with some safety margin. The algorithm has a minimum or maximum beam height that could be tied to the elevation of the road at some point ahead of the vehicle.

Figure 8:
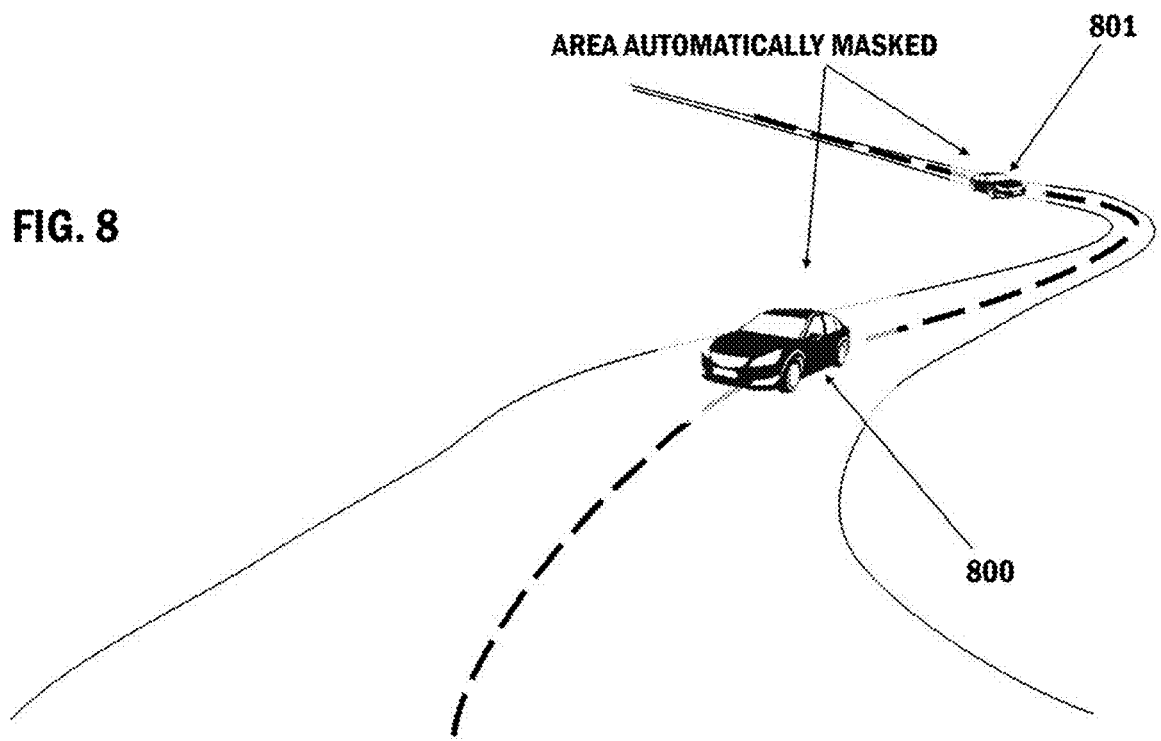
FIG. 8 illustrates cars travelling on a road with areas that are automatically masked so as to not blind other traffic, as contemplated by the present disclosure.

FIG. 8 shows vehicle 800 and vehicle 801 traveling along in a road and both vehicles have areas of their headlamps automatically masked. This helps to avoid blinding other traffic. This is an example showing the concept of the other embodiment of this present invention that involves masking or blocking high beam light by dynamic LCD or having light segmented into different areas where they can be selectively turned on or off.

The system in FIG. 8 involves a mechanism of masking or blocking light emitted by the head light based on the elevation profile and the blocking is done by having a dynamic LCD or similar technology or having light segmented into different areas where they can be selectively turned on or off. In this case, the headlamp is not actually moved, and the light is blocked or not emitted in areas where other vehicles are present. In addition, partial blocking is possible so as not to blind the other driver but still make them aware of their presence.

The present system may comprise a plurality of sensors to detect road conditions and opposing traffic, and a plurality of head light control devices to control the head light beam pattern emitted from the vehicle. The sensors and control devices may be connected by a computing device, which may process inputs from the plurality of sensors and send instructions to the plurality of control devices. In an embodiment wherein the pitch and yaw of the head lights is to be controlled, the computing device may issue commands to the motors or piezos of the system. In an embodiment comprising multiple selectable beams, the computing device may issue on and off commands to the individual beam controllers.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. An autonomous headlight adjustment system, comprising:
    a computing device;
    at least one headlight;
    at least one head light control in communication with the computing device; and
    a non-transitory memory device in communication with the computing device, the non-transitory memory device storing (i) vehicle position data, (ii) elevation profile data, (iii) road data, and (iv) instructions that when executed by the computing device, result in:
        computing, utilizing the elevation profile data and the road data, a projection of a road;
        computing, utilizing the projection of the road and the vehicle position data, a plurality of Euler angles representing locations on the projection of the road where other vehicles may be expected;
        detecting an external light source;
        identifying a bearing to the light source;
        identifying, based on the bearing to the light source and the computed Euler angles, that the light source is located at a location on the projection of the road where other vehicles may be expected; and
        adjusting, based on the identifying that the light source is located at the location on the projection of the road where other vehicles may be expected, and by actuating the at least one head light control, an area of the road illuminated by the at least one headlight.

2. The autonomous headlight system of claim 1, wherein the elevation profile data is defined by data received from a sensor and, further comprising:
    the sensor.

3. The autonomous headlight system of claim 2, wherein said sensor comprises a LADAR device.

4. The autonomous headlight system of claim 2, wherein said sensor comprises a stereo camera.

5. The autonomous headlight system of claim 2, wherein said sensor comprises a ranging sensor.

6. The autonomous headlight system of claim 2, wherein the adjusting, comprises:
    identifying one of the Euler angles from the plurality of Euler angles that is the lowest with respect to the bearing to the light source;
    identifying an angular factor of safety;
    computing a target headlight angle based on the angular factor of safety and the identified one of the Euler angles; and
    actuating the at least one head light control to set the at least one headlight in accordance with the target headlight angle.

7. The autonomous headlight system invention of claim 2, wherein the adjusting, comprises:
    identifying a target setting for the at least one headlight; and
    controlling a rate of change for the at least one headlight by attenuating the actuation of the at least one head light control.

8. The autonomous headlight system of claim 2, wherein the at least one head light control comprises at least one head light aiming motor.

9. The autonomous headlight system of claim 2, wherein the at least one head light control comprises a dynamic LCD.

10. The autonomous headlight system of claim 2, wherein the at least one head light control comprises a dynamic LCD and a partial head light mask.

11. The autonomous headlight system of claim 2, wherein the at least one head light control comprises a plurality of head light beams and a plurality of corresponding beam selector switches.

* * * * *